(12) United States Patent
Nyallau et al.

(10) Patent No.: US 11,159,717 B2
(45) Date of Patent: Oct. 26, 2021

(54) SYSTEMS AND METHODS FOR REAL TIME SCREEN DISPLAY COORDINATE AND SHAPE DETECTION

(71) Applicant: eyecandylab Corporation, Los Angeles, CA (US)

(72) Inventors: Kenny Anak William Nyallau, Munich (DE); Sascha Ahmann, Ergoldsbach (DE); Robin Sho Moser, Munich (DE); Thomas Orzikowski, Weng (DE)

(73) Assignee: eyecandylab Corporation, Los Angeles, CA (US)

( * ) Notice: Subject to any disclaimer, the term of this patent is extended or adjusted under 35 U.S.C. 154(b) by 259 days.

(21) Appl. No.: 16/388,510

(22) Filed: Apr. 18, 2019

(65) Prior Publication Data

US 2020/0336656 A1    Oct. 22, 2020

(51) Int. Cl.
  *G06K 9/62*      (2006.01)
  *H04N 5/232*    (2006.01)
  *G06N 3/08*     (2006.01)
  *G06F 3/0484*   (2013.01)
  *G06K 9/00*     (2006.01)

(52) U.S. Cl.
  CPC ..... *H04N 5/23229* (2013.01); *G06F 3/04845* (2013.01); *G06K 9/00671* (2013.01); *G06K 9/6256* (2013.01); *G06N 3/08* (2013.01)

(58) Field of Classification Search
  CPC .... H04N 5/23229; G06N 3/08; G06K 9/6256; G06K 9/00671; G06K 9/00711; G06K 9/6271; G06K 9/4604; G06F 3/04845
  See application file for complete search history.

(56) References Cited

U.S. PATENT DOCUMENTS

| 2014/0317659 | A1* | 10/2014 | Yasutake | H04N 21/43615 725/43 |
| 2017/0148222 | A1* | 5/2017 | Holzer | H04N 13/279 |
| 2017/0323481 | A1* | 11/2017 | Tran | G06K 9/00771 |

(Continued)

FOREIGN PATENT DOCUMENTS

EP    3410353 A1    12/2018

OTHER PUBLICATIONS

He et al., "Mask R-CNN", 2017 IEEE International Conference on Computer Vision (ICCV), Oct. 29, 2017, pp. 2961-2969.

(Continued)

*Primary Examiner* — Phuoc Tran
(74) *Attorney, Agent, or Firm* — Vorys, Sater, Seymour & Pease

(57) ABSTRACT

Systems, methods, and devices are provided for detecting coordinate information about a screen display shown at a monitor unit. The monitor unit is located within the field of view of a vision-based computing device. A set of source images captured by the camera representative of the screen display shown at the monitor unit are stored. A neural network model is stored in memory. A processor is configured to preprocess the set of source images to obtain an input frame and to process the input frame with the loaded neural network model to predict corner coordinates of the screen display in real-time. In a further feature, the processor may be configured to estimate a pose of the vision-based computing device relative to the monitor unit when a level of confidence in the updated corner coordinates exceeds a threshold.

14 Claims, 9 Drawing Sheets

(56) References Cited

U.S. PATENT DOCUMENTS

2018/0174038 A1\*  6/2018  Jiang .................. G06N 3/08
2018/0352186 A1   12/2018  Ahmann et al.
2019/0043203 A1\*  2/2019  Fleishman ............ G06N 3/04
2020/0250850 A1\*  8/2020  Chakravarty ......... G06T 7/74

OTHER PUBLICATIONS

Jiao et al., "A Method of TV Screen Shape Detection Based on Threshold Segmentation", IEEE 2013 Sixth International Symposium on Computational Intelligence and Design, 2013, pp. 116-120.
Chen, et al., DeepLab: Semantic Image Segmentation with Deep Convolutional Nets, Atrous Convolution, and Fully Connected CRFs. IEEE Transactions on Pattern Analysis and Machine Intelligence, pp. 1-14.
Szegedy et al., "Inception-v4, Inception-ResNet and the Impact of Residual Connections on Learning", Proceedings of the Thirty-First AAAI Conference on Artificial Intelligence (AAAI-17), Feb. 9, 2017, pp. 4278-4284.
Wang, "Pelee: A Real-Time Object Detection System on Mobile Devices", 32nd Conference on Neural Information Processing Systems (NeurIPS 2018), 10 Pages.
Zhang et al., "Whiteboard It! Convert Whiteboard Content into an Electronic Document", White Paper, Microsoft, https://www.microsoft.com/en-us/research/publication/whiteboard-it/, Aug. 12, 2002, 16 Pages.

\* cited by examiner

Table 1: Overview of PeleeNet architecture

| Stage | Layer | | Output Shape |
|---|---|---|---|
| | Input | | 224 x 224 x 3 |
| Stage 0 | Stem Block | | 56 x 56 x 32 |
| Stage 1 | Dense Block | DenseLayer x 3 | 28 x 28 x 128 |
| | Transition Layer | 1 x 1 conv, stride 1 | |
| | | 2 x 2 average pool, stride 2 | |
| Stage 2 | Dense Block | DenseLayer x 4 | 14 x 14 x 256 |
| | Transition Layer | 1 x 1 conv, stride 1 | |
| | | 2 x 2 average pool, stride 2 | |
| Stage 3 | Dense Block | DenseLayer x 8 | 7 x 7 x 512 |
| | Transition Layer | 1 x 1 conv, stride 1 | |
| | | 2 x 2 average pool, stride 2 | |
| Stage 4 | Dense Block | DenseLayer x 6 | 7 x 7 x 704 |
| | Transition Layer | 1 x 1 conv, stride 1 | |
| Classification Layer | | 7 x 7 global average pool | 1 x 1 x 704 |
| | | 1000D fully-connecte,softmax | |

FIG. 5

TABLE 2

*BS (batch size) is set to 1

| Stage | Layer | | Output shape |
|---|---|---|---|
| | Input: 108x192x7 | | |
| Stage 0 | Stem block | | BS x 27 x 48 x 32 |
| Stage 1 | Dense block | Dense layer x3 | BS x 13 x 24 x 80 |
| | Transition layer | 1x1 conv, Relu6, stride 1 | |
| | | 2x2 conv, average pooling, Relu6, stride 2 | |
| Stage 2 | Dense block | Dense layer x4 | BS x 6 x 12 x 144 |
| | Transition layer | 1x1 conv, Relu6, stride 1 | |
| | | 2x2 conv, average pooling, Relu6, stride 2 | |
| Stage 3 | Dense block | Dense layer x8 | BS x 3 x 6 x 272 |
| | Transition layer | 1x1 conv, Relu6, stride 1 | |
| | | 2x2 conv, average pooling, Relu6, stride 2 | |
| | Fully connected | | BS x 9 |

FIG. 6

SYSTEMS AND METHODS FOR REAL TIME SCREEN DISPLAY COORDINATE AND SHAPE DETECTION

BACKGROUND

Technical Field

The present disclosure relates to image processing, computer vision, artificial neural network and augmented reality.

Related Art

Vision-based computing devices, whether they are camera enabled mobile or wearable devices and/or camera connected machinery, now provide a variety of content to users in many different types of applications. Vision-based computing devices are used to provide a second screen experience that can augment a first screen experience. Augmented reality (AR) and virtual reality (VR) technology have been deployed on vision-based computing devices to augment a watching experience with additional information such as video, images, audio, online and offline metadata. To augment a watching experience on a vision-based computing device where the vision-based computing device acts as a second screen (which is enabled by a monitor unit), it may be necessary to detect the shape of the first display screen. Such screen shape detection has been difficult or prohibitive on vision-based computing devices especially when processing video content and under real-time conditions.

Technological advances in artificial intelligence and hardware performance on vision-based computing devices now allow computer applications to provide some intelligent prediction analysis, computer and machine vision-based object recognition methods and content segmentation. Challenges exist to apply these advances to vision-based computing devices especially when processing computationally intensive video and real-time conditions encountered with a video stream.

Modern artificial neural network object recognition methods are known to be able to recognize objects and provide accurate ground truth prediction by rendering bounding box and polygon-based boundaries surrounding particular objects. Such objects can include vehicles, animals, people, buildings or other discrete objects. The bounding box method is more widely known technique as it does not necessarily have to localize the detection box within precise locations of the detected object or particularly to recognize the actual object. Image segmentation involves a much more sophisticated implementation whereby the polygonal boundaries are localized within the predicted objects; hence the precision of ground truth is visibly and accurately "marked" around the objects during recognition process.

With image segmentation, among many other use cases, the potential of pixel-precise boundaries can be used to extract and/or acquire specific information from a particular image. However, the image segmentation technique is generally computation-resource intensive and it would require high performance hardware to apply inference in real-time within a reasonable frame rate.

One limited approach to detect TV screen shape uses a threshold segmentation technique. See, H. Jiao and H. Lu, "A Method of TV Screen Shape Detection Based on Threshold Segmentation," 2013 *Sixth International Symposium on Computational Intelligence and Design*, Hangzhou, 2013, pp. 116-120. This academic research paper is more closely related to utilizing conventional computer vision image processing techniques such as thresholding and edge-based method. One downside for this approach is the reliance on high contrast images, particularly when the proposed screen detection method is required to work with many different types of requirements, such as, lighting conditions, video types, screen glaring, or background color. Therefore, threshold and edge-based segmentation is not enough to acquire the shape of television screen display in different environments where contrast may be unreliable or lacking.

One example neural network-based segmentation technique that is currently an ongoing topic in computer vision research area is called object instance segmentation. Object instance segmentation is used to classify individual instance of objects and localize every object on pixel level, allowing for masking of objects that are easily discernible from each other. One instance segmentation technique is called Mask R-CNN (K. He, G. Gkioxari, P. Dollar and R. Girshick, "Mask R-CNN," 2017 *IEEE International Conference on Computer Vision (ICCV)*, Venice, 2017, pp. 2980-2988.), developed by Facebook AI Research. This Mask R-CNN technique provides a method for segmentation masks on a region of interest in conjunction with an existing method for classification and bounding box regression. This results in a relatively good detection result from a method of instance segmentation, bounding box object detection, and keypoints detection. However, Mask R-CNN architecture suffers from high computation requirements and is not reliable for offline deployment on devices with limited hardware capabilities.

Another example uses instance segmentation on a neural network architecture for use on a camera-based computing device. Google Inc. developed a segmentation technique that is more performant for low powered computing device called Deeplab V3 (L. Chen, G. Papandreou, I. Kokkinos, K. Murphy, and A. L. Yuille, 2016, "DeepLab: Semantic Image Segmentation with Deep Convolutional Nets, Atrous Convolution, and Fully Connected CRFs", IEEE Transactions on Pattern Analysis and Machine Intelligence, pp. 10.1109/TPAMI.2017.2699184) to implement real-time video segmentation.

Another technique for classifying position or location prediction is known as landmark prediction. Landmark prediction is commonly used to detect facial landmarks whereby landmark points are strategically placed on facial features. Landmark detection can also be used to predict feature points on other objects but may suffer from false prediction, especially for the screen shape detection where boundaries of an image may not have sufficient features to detect due to dynamic moving images on the screen and variety of environment conditions.

One approach to screen detection acquires video content images using a white border. The white border surrounds the video as pre-defined boundaries for content extraction. This white border is embedded into the video by overlaying the border watermark on top of the video content. With this white border, a television (TV) pose estimation can also be acquired, providing a tracking method that tracks the position and orientation of the television screen according to world space coordinates. See, commonly-assigned published European patent application, EP 3410353A1.

What is needed are new and improved approaches to screen detection and in particular to coordinate detection of a screen display. Screen coordinate detection systems and methods are needed that can detect screen coordinates and shape information of a display within a video stream in real-time on a vision-based computing device. Further what is needed is screen coordinate and shape information detection that can operate on a mobile device and support an augmented reality application on the mobile device.

BRIEF SUMMARY

The present disclosure overcomes the above problems. Systems, methods, and devices are provided for detecting coordinate and shape information about a screen display. In embodiments, systems, methods, and devices are provided for detecting information about a screen display shown at a monitor unit within the field of view of a camera of a vision-based computing device.

In an embodiment, a system detects coordinate information of a screen display shown at a monitor unit. The monitor unit is located within the field of view of a camera of a mobile device. The mobile device includes a memory and a processor. The memory is configured to store a set of source images captured by the camera representative of the screen display shown at the monitor unit. The processor is configured to load a neural network model for storage in the memory, preprocess the set of source images stored in the memory to obtain an input frame, and process the input frame with the loaded neural network model to predict corner coordinates of the screen display.

Further features are provided. In one feature, the processor is configured to process the input frame with the loaded neural network model to obtain corner coordinates and an uncertainty value which are then used to calculate the level of confidence in the predicted corner coordinates of the screen display. The processor may update the predicted corner coordinates of the screen display when a level of confidence exceeds a threshold. The processor may also normalize initial corner coordinates based on a size of the source image to obtain final predicted corner coordinates in units of pixels.

In another embodiment, the processor is configured to estimate a monitor unit aspect ratio and classify the level of confidence in the final predicted corner coordinates based on the estimated monitor unit aspect ratio and the obtained uncertainty value.

In a further feature, the processor is configured to estimate a pose of the mobile device relative to the monitor unit when a level of confidence in the updated corner coordinates exceeds a threshold.

In one feature, the loaded neural network model may be an artificial neural network model for a mobile device. The processor may be configured to process the input frame with the artificial neural network model for a mobile device in real-time to predict corner coordinates of the screen display.

In one embodiment, the mobile device may include a handheld computing device housing the memory and the processor. In another embodiment, the mobile device may be a wearable computing device housing the memory and the processor.

In further embodiments, methods for detecting information about a screen display shown at a monitor unit within the field of view of a camera of a mobile device are provided. A method may include loading a neural network model for storage in the memory of the mobile device and storing a set of source images captured by the camera representative of the screen display shown at the monitor unit. The method may further include preprocessing the set of source images stored in the memory to obtain an input frame and processing the input frame with the loaded neural network model to predict corner coordinates of the screen display. In an example, the input frame processing may include processing the input frame with the loaded neural network model to obtain an uncertainty value. The uncertainty value and the predicted corner coordinates are used to calculate a level of confidence in the predicted corner coordinates of the screen display. Also updating may include updating the predicted corner coordinates of the screen display when a level of confidence exceeds a threshold. The updating may also include normalizing initial corner coordinates based on a size of the source image to obtain final predicted corner coordinates in units of pixels.

In a further feature, the updating includes estimating a monitor unit aspect ratio and classifying the level of confidence in the final predicted corner coordinates based on the estimated monitor unit aspect ratio and the obtained uncertainty value.

In a still further feature, the updating includes estimating a pose of the mobile device relative to the monitor unit when a level of confidence in the updated corner coordinates exceeds a threshold.

In further embodiments, devices for detecting information about a screen display shown at a monitor unit within the field of view of a camera of a mobile device are provided.

Further embodiments, features, and advantages of this invention, as well as the structure and operation and various embodiments of the invention, are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

FIG. 5 is a table describing an example PeleeNet architecture in an embodiment.

FIG. 6 is a table describing an example PeleeNet architecture in a further embodiment.

Figure 1:
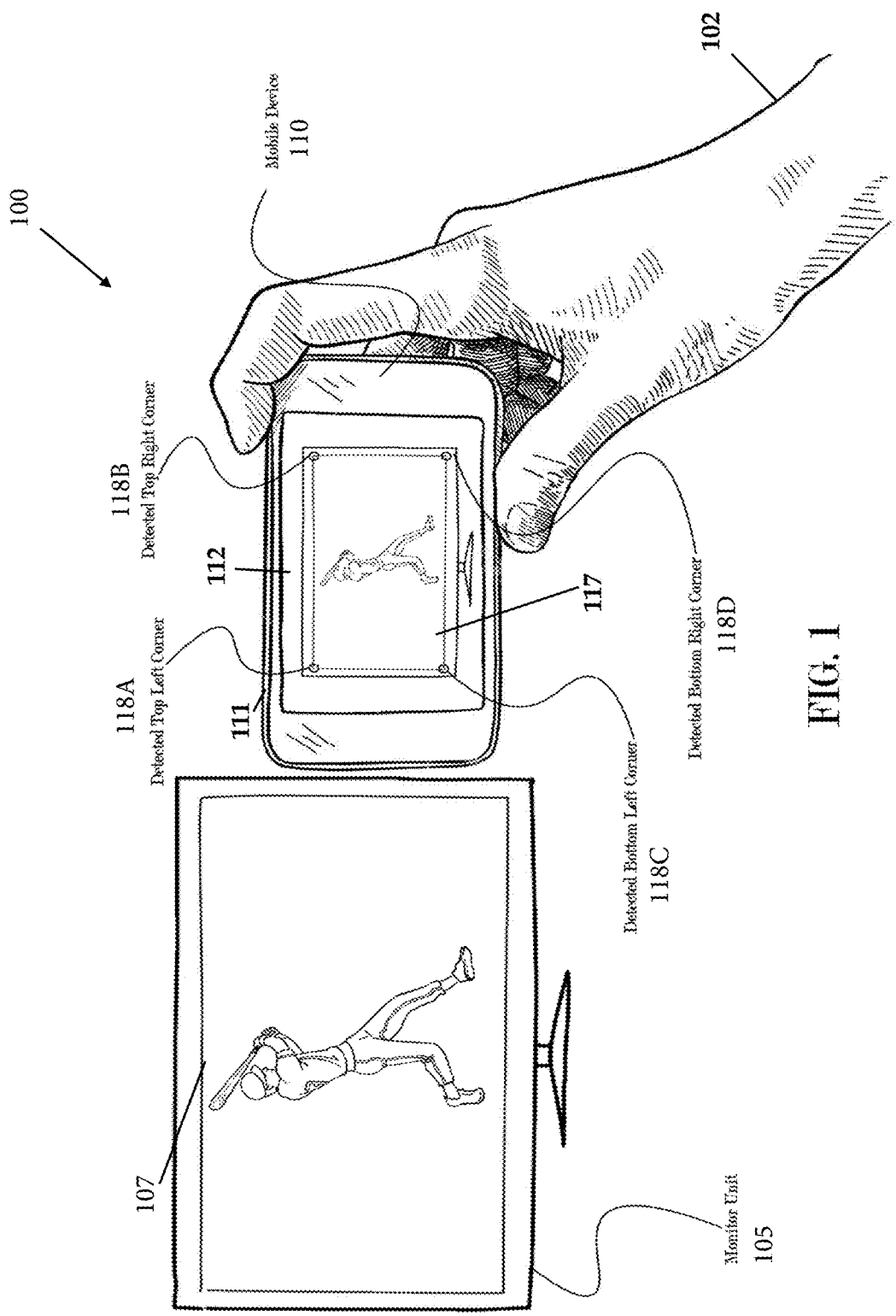
FIG. 1 is a diagram illustrating a mobile device with detection of corner coordinates of a screen display output by a monitor unit according to an embodiment of the present invention.

Further details of one or more embodiments of the invention are set forth in the accompanying drawings and the description below. Other features, objects, and advantages of the invention will be apparent from the description and drawings, and from the claims.

DETAILED DESCRIPTION OF EMBODIMENTS

The present disclosure relates to computer-implemented object detection and recognition, and in particular to, display screen detection. Further aspects include detection of coordinates of a display screen, and in particular, corner coordinate detection in real-time.

Embodiments of the present disclosure relate to systems, methods, and devices for display screen detection. In embodiments, systems, methods, and devices detect information about a screen display shown at a monitor unit within the field of view of a camera of a vision-based computing device, such as, a mobile or wearable computing device.

Computer-implemented detection of coordinates of a display screen, and in particular, detection of corner coordinates in real-time is described. Embodiments include automatic systems and methods for detecting a monitor display, such as a display screen. In one feature, an artificial neural network (ANN)-based system is used to detect screen display corners in real-time. The screen display corner detection allows further extracting of image and video content to be performed more efficiently. In further embodiments, screen display pose estimation is determined. This pose estimation allows two dimensional and three dimensional positional and rotational tracking of a television screen or monitor display within a mobile device camera's world space coordinates.

In one feature, corner coordinate detections can occur in real-time without imparting noticeable delay or hindering a user's experience on the mobile device. In an embodiment, not intended to be limiting, corner coordinate detection can occur in real-time at a rate consistent a user's interaction with the mobile device or an application on the mobile device, such as, when viewing a video stream or live broadcast, or otherwise viewing or manipulating a source image. In an example, not intended to be limiting, corner coordinate detection can occur in real-time at a rate equal to or greater than 20 frames per second. A real-time detection may occur on a minimum benchmarked mobile device which can run a deep neural network model. In this way, the inventors applied latest developments in the deep learning and machine learning domain to significantly improve and enable highly performant neural network prediction that can be deployed within the limitations of current modern mobile devices.

Terminology

The term "screen display" as used herein refers to a television screen, monitor display, LED display, mobile device display, or other type of two dimensional or three-dimensional display.

The term "vision-based computing device" refers to a computing device coupled to one or more cameras. A vision-based computing device may be a mobile computing device, wearable computing device, connected or wired computing device, mounted or positioned computing device, or other type of computing device or system that can receive and process output from one or more digital cameras.

In embodiments, a neural network architecture for detecting screen displays may detect screen displays, but not limited to television screen, monitor display, LED display, mobile device display, projector display and two dimensional or three-dimensional display; the condition for such detection requires quadrilateral or rectangular shaped displays and possibly curved display.

The neural network architecture for the screen corners recognition system can be used in various platforms or medium including, but not limited to, entertainment, infotainment, live broadcast, live video streaming and offline video content. The invention is robust to geometric invariance including position/translation, rotation and scale and also to various lighting condition including in bright and dimmed environment.

As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Embodiments as used herein refer to illustrations described herein with reference to particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Corner Coordinate Detection

FIG. 1 is a diagram illustrating a system 100 having a monitor unit 105 and a mobile device 110 with detection of corner coordinates according to an embodiment of the present invention. Monitor unit 105 includes a display 107. Display 107 is an area of monitor unit 105 that displays video or other images for viewing by a user 102. Display 107 can be all or part of the area of a display screen on monitor unit 105. Monitor unit 105 can be any type of monitor including, but not limited to, a television, computer monitor, tablet, flat panel display, billboard, scoreboard, kiosk or terminal display, automobile panel, projector, beamer or other electronic device having a display or emitted output. Mobile device 110 includes a housing 111 supporting a display 112.

In operation mobile device 110 is positioned to detect a source image representative of both monitor unit 105 and content shown in display 107. The source image may be digital video or other sequence of images captured by a camera of the mobile device 110. For example, as shown in FIG. 1, monitor unit 105 (and in particular display 107) may be positioned in the field of the view of the camera of mobile device 110 so that the content of display 107 and monitor unit 105 are captured and shown in display 112.

According to one feature, system 100 operates so that corner coordinates of display 107, shown in mobile device display 112, are detected. As shown in FIG. 1, corners of display 107 appear in display 112. In an embodiment, four corner coordinates 118A-118D corresponding to four points are detected for a display area 117 on display 112. The four corner coordinates 118A, 118B, 118C, and 118D correspond respectively to the detected top left corner, top right corner, bottom left corner, and bottom right corner. While four corners are described in this example and may be helpful in general for a rectangular input frame, the present invention is not so limited. A smaller or larger number of points may be used depending upon a particular application. For example, for a square frame one or two points may be sufficient. Where size or relative geometry information is known or fixed, fewer points may be used. Also, while corners are illustrative points for quadrilateral shapes including square or rectangular shapes, points at other locations or other shapes (such as, vertices of triangles or polygons) may be used.

Corner coordinate detection including system, method, and device embodiments are described in further detail below with respect to FIGS. 2-8.

Figure 2:
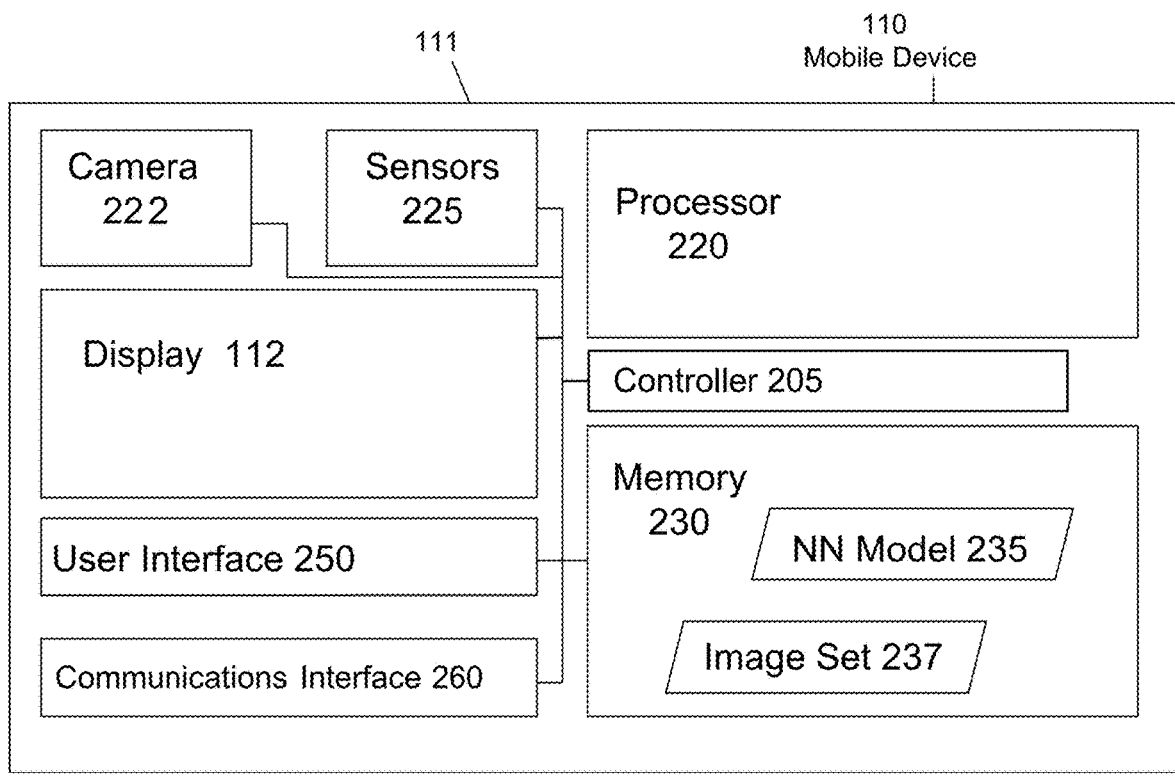
FIG. 2 is a block diagram of a mobile device configured to detect real-time screen display coordinates using a neural network according to an embodiment of the present invention.

FIG. 2 is a block diagram of a mobile device 110 configured to detect real-time screen display coordinates using a neural network according to an embodiment of the present invention. Mobile device 110 includes housing 111, display 112, one or more processors 220, cameras 222, sensors 225, memory 230, user-interface 250 and communications interface 260. Memory 230 can store a neural network model 235. Memory 230 may also store an image set 237 containing an input frame of video or other source images captured by camera 222. Display 112 may be any type of display including but not limited to a light-emitting diode type display, liquid crystal display, plasma display, cathode ray tube display, or other type of display device. One or more digital cameras 222 may be used that face forward, rear or in other desired orientation. One or more processors 220 can be any type of processor, multi-processor, programmable logic device or other type of processor unit. User-interface 250 can be a graphic user-interface, touch screen interface or other input/output device for interacting with a user. Communications interface 260 may be a bus or interface that allows data communication between various components of mobile device 110.

A controller 205 may perform control operations to carry out corner coordinate detection as described herein including routine 300 described below. Controller 205 may be implemented in software, hardware, firmware or any combination thereof. For example, controller 205 may be an application or part of an application, such as a user-interface element, that enables a user to initiate operation including coordinate detection. In an embodiment, controller 205 may be automatically initiate coordinate detection as part of an augmented reality or other content viewing application.

In a further feature, mobile device 110 may be a handheld computing device held by a user 102 as shown in FIG. 1. For example, the handheld computing device may be a smartphone, tablet, laptop, game console, joystick, toy, automobile accessory, or other type of handheld computing device. Alternatively, mobile device 110 may instead be a wearable computing device (such as electronic glasses, goggles, headgear, badge, smart card or other wearable item) worn by a user 102. For brevity, the operation of mobile device 110 is described further below with respect to the coordinate detection routine 300 in FIG. 3A-3B. While routine 300 is described primarily with respect to mobile device 110 for brevity, this is not intended to be limiting. Routine 300 may be carried out on other vision-based computing devices as would be apparent to person skilled in the art given this description.

Figure 3A:
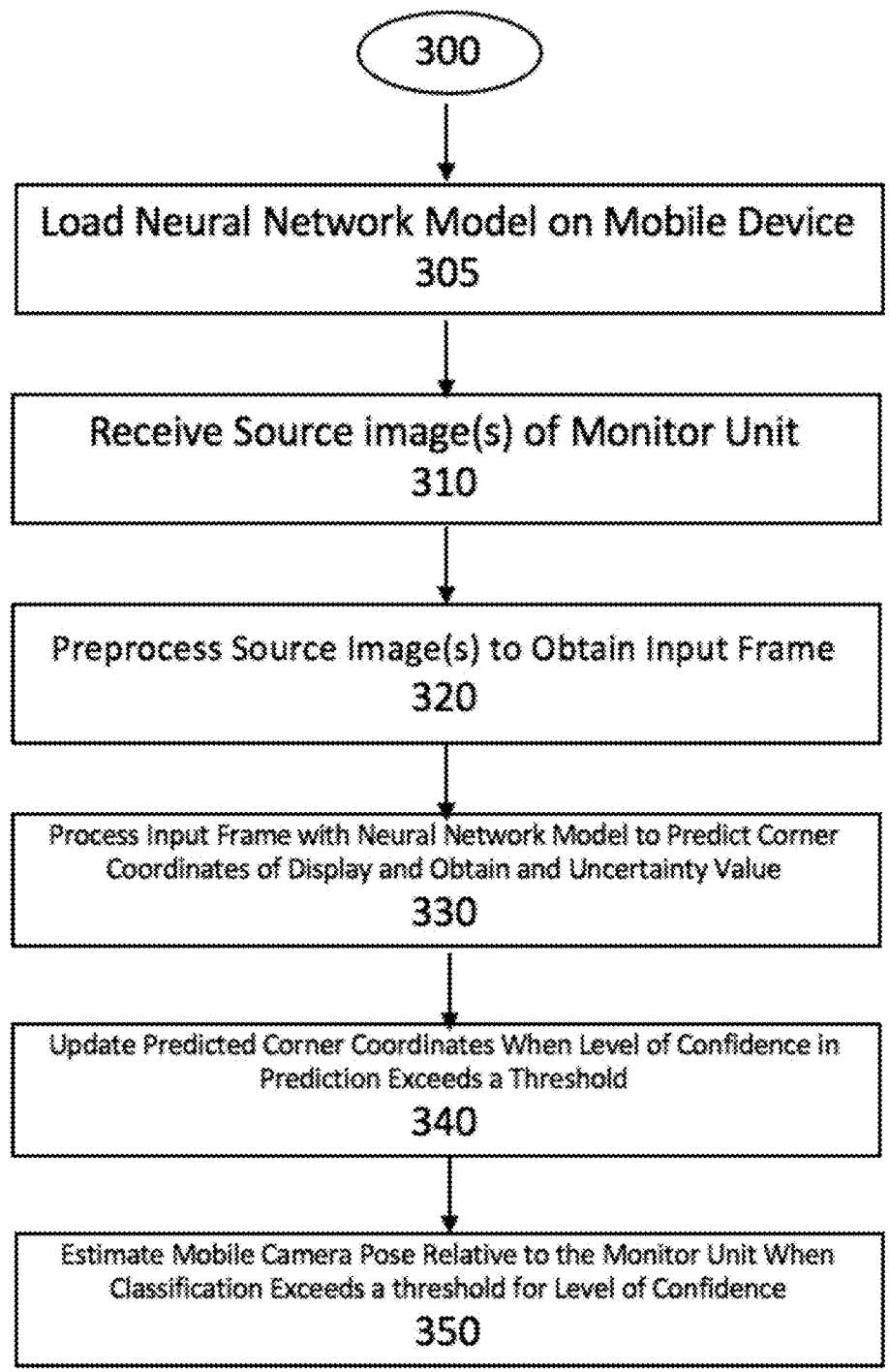
FIG. 3A is a flowchart diagram of source image capture and real-time screen display coordinate detection and pose estimation according to an embodiment of the present invention.
Figure 3B:
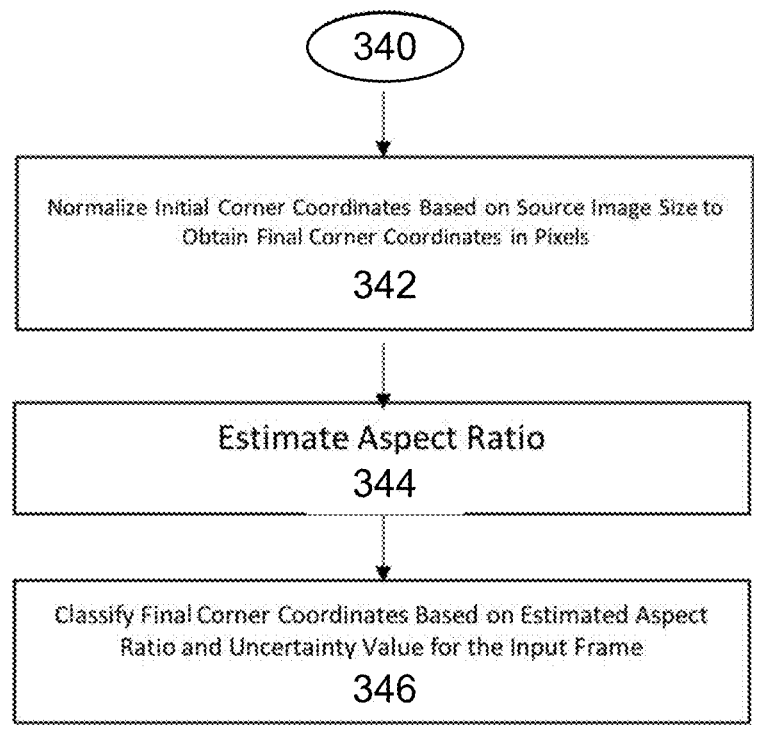
FIG. 3B is a flowchart diagram showing in further detail the updating of detected display coordinates based on the level of confidence in the prediction according to an embodiment of the present invention.

FIG. 3A is a flowchart diagram of a routine 300 for detecting information about a screen display shown at a monitor unit within the field of view of a camera of a mobile device according to an embodiment of the present invention (steps 305-350). FIG. 3B is a flowchart diagram showing in further detail the updating of detected display coordinates in FIG. 3A based on the level of confidence in the prediction according to an embodiment of the present invention. In one embodiment, steps 305 and 310-350 may be carried out by one or more processors 220 in response to control provided by controller 205 and in communication with memory 230.

In step 305, a neural network (NN) model is loaded onto mobile device 110. For example, controller 205 may initiate loading of NN model 235 into memory 230. This loading can be performed prior to or immediately preceding operation. In embodiments, NN model 235 may be a neural network model that can be configured for a mobile device. In one embodiment, a deep neural network model may be used having an artificial neural network model (ANN) with multiple layers including hidden layers between input and output layers. In an embodiment, a neural network architecture optimized for inference on mobile devices may be used. For example, a convolutional neural network (CNN) may be used, such as, the PeleeNet described by X. L. Robert Wang, S. Ao, and C. X. Ling, "*Pelee: A real-time object detection system on mobile devices*", in ICLR Workshop, 2018 "R. Wang et al. paper")).

In step 310, source images of content on display 107 on monitor unit 105 are received. As mentioned earlier with respect to a FIG. 1, a user 102 may position display 107 on monitor unit 105 with the field of view of camera 222 on mobile device 110. A set of source images 237 (also called frames) captured by the camera 222 and representative of the screen display 107 are stored in memory 230. The set of source images may also be displayed on display 112.

In step 320, preprocessing is carried out on the set of source images stored in the memory to obtain an input frame. For example, a frame is an image obtained from a device camera 222. The frame may be preprocessed before passing to a deep neural network input. In one implementation, before passing the image frame to deep neural network input, the following preprocessing steps may be performed on each frame:

Convert to grayscale color format.
    Scale to the target input size. It is performed using area resampling.
    Convert to floating point data type.
    Normalize to the range [−1, 1]. It is performed using a min-max normalization where a pixel with the lowest value becomes −1 and the pixel with the biggest value becomes 1.

Example pseudocode for performing the above preprocessing is as follows:

```
preprocess_input_frames(input_frames_array)
{
    for (frame in input_frames_array)
```

```
{
    frame = convert_to_grayscale(frame);
    frame = resize(frame);
    frame = normalize(frame);
}
merged_tensors = make_tensor_from_image_arrays(input_frames_array);
return merged_tensors;
}
```

A sequence of frames may be an array formed from consecutive frames obtained from device camera 222. A sequence of frames is formed from frames during this preprocessing step before being passed to a deep neural network input. A required (optimal) length of sequence may depend on a particular deep neural network architecture. For example, typical sequence length values may range from 1 to 9 frames.

In step 330, the input frame (or sequence of frames) is processed with the loaded neural network model 235 on mobile device 110 to predict corner coordinates of the screen display. The predicted corner coordinates may be displayed on display 112. For example, as shown in FIG. 1, predicted corner coordinates 118A-118D may be displayed in an area 117 of display 112 on mobile device 110.

In one embodiment, the deep neural network (DNN) model may be a convolutional neural network (CNN) model, such as, the PeleeNet model. In one example, the PeleeNet model may have four stages and a classification layer as shown in Table 1 in FIG. 5. Table 1 in FIG. 5 describes the example Peleenet architecture in the R. Wang paper, sec. 2, p. 4.

For an input image preprocessed in step 320, a sequence of frames (up to 7 frames) may be stacked into an input channel before passing them to the stem block. A stem block may be modeled from the Inception v4 proposed by C. Szegedy, S. Ioffe, V. Vanhoucke, and A. Alemi. "*Inception-v4, inception-resnet and the impact of residual connections on learning.*" In AAAI, pp. 4278-4284, 2017. In this way, a stem block can effectively improve feature expression ability without significant additional computational cost.

In one example implementation the inventors used a PeleeNet model. In this case, the example PeleeNet followed the connectivity pattern and some of key design principles of DenseNet, and was designed to meet strict constraints on memory and computational budget. The PeleeNet model had a quite flexible architecture. It consists of several structural units named stages each of which (besides the 0th) consists of several dense blocks and one transition block. One variant of the PeleeNet had the following hyperparameters:
Number of stages including:
0th stage:
Type—either special stem block (proposed in the R. Wang et al. paper) or conventional convolution and pooling.
Initial number of features.
For stages from 1st to last (feature extraction):
Number of dense blocks.
Growth rate—number of features for dense blocks intermediate layers.
Bottleneck width—coefficient which together with growth rate defines the number of features for dense blocks bottleneck layers.
An example PeleeNet variant may have the following hyperparameters values:
Number of stages=5
0th stage type=stem block
Initial number of features=32
Number of dense blocks=[3, 4, 8, 6]
Growth rate=32
Bottleneck width=[1, 2, 4, 4]

FIG. 6 is a table that illustrates a modified PeeleNet architecture used by the inventors in an embodiment. In this example implementation carried out by inventors, the inventors selected the following hyperparameters values as a baseline:
Number of stages=4 (1 stem block+3 dense blocks)
0th stage type=stem block
Initial number of features=32
Number of dense blocks=[3, 4, 8]
Growth rate=32
Bottleneck width=[1, 2, 4]

These hyperparameters were obtained by starting from original values and further incrementally reducing the depth of the network while final validations loss decreases and until it started to grow back again. In an example, an original architecture had a final validation loss 0.615, while the baseline variant had a final validation loss 0.04.

Also according to inventors, one can select the following deep neural network parameters, however these are parameters are not necessarily denoting the optimum values (since these are subject to experimentation) and therefore can be tweaked and adjusted according to necessity or a desired application:
Input image size=192×108 pixels.
Frame sequence length=7.

In a further feature, the input frame processing (step 330) includes processing the input frame with the loaded neural network model to obtain an uncertainty value (U) along with predicted corner coordinates of the screen display.

Consider a two-dimensional quadrilateral image. For an input frame sequence, the deep neural network may produce 9 floating point output values ([x0, y0, x1, y1, x2, y2, x3, y3, U]):

a. 4 [x, y] coordinates pairs of display corners on the last frame in sequence (the newest one). For example, in the case of a television monitor unit, these 4 [x, y] coordinates may be television (tv) coordinates. Coordinates may be normalized by the width of an input frames. In example tests, the inventors found other frames may be used other than the last frame for predictions but there are no noticeable quality improvements. Also, running the inference on frames other than the last frame can introduce additional time lag.

b. 1 uncertainty value (U): this is also called an "inverse confidence" value. The lower this value U the more confident is the deep neural network prediction for the corners coordinates. Example pseudocode for acquiring the inverse confidence is as follows:

```
get_confidence_value(camera_parameters, tv_size_x, tv_size_y,
corners_list, uncertainty_value, weights_vector, bias_value)
{
perfect_aspect_ratio = tv_size_x / tv_size_y;
estimated_aspect_ratio_value =
estimated_aspect_ratio(camera_parameters, corners_list);
aspect_ratio_error_value = absolute_value(perfect_aspect_ratio -
estimated_aspect_ratio);
confidence_from_network_output_values = add(dot_product(
{aspect_ratio_error_value, uncertainty_value, aspect_ratio_ error_value ^
2, uncertainty_value ^ 2, aspect_ratio_error_value * uncertainty_value},
weights_vector), bias_value) ;
return confidence_from_network_output_values;
}
```

Example pseudocode for acquiring the prediction is described:

```
for(corners in corners_list){
current_corners_list(corners) = merged_tensors * source_width;
predicted_corners_coordinates_and_uncertainty_value =
model_inference(merged_tensors);
confidence = get_confidence_value(camera_parameters, get_tv_size_x,
get_tv_size_y, current_corners_list,
predicted_corners_coordinates_and_uncertainty_value);
if(confidence >= confidence_threshold){
updateCornersCoordinates(current_corners_list);
}
}
```

In one embodiment a loss function is used to obtain an uncertainty value U. In particular, to predict both TV corners coordinates and uncertainty. The inventors used a so called "sigma-loss" function as a training objective. It has the following form:

$$\text{Loss} = L2/(2*\exp(2*U) + \text{EPS}) + U \quad (1)$$

The loss function equation (1) above comprises:
L2—mean squared error of coordinated prediction normalized by sum of corresponding TV diagonals (ground truth)
ii. U—uncertainty value constrained by tan h function
iii. EPS (epsilon)=1e-8 or $(1*10^{-8})$
This loss function is minimized only if both its arguments are minimized (L2→0 and U→minus infinity). And in cases when L2 is larger, the model has to make U larger too to compensate it.

In step 340, the predicted corner coordinates of the screen display are updated when a level of confidence exceeds a threshold. FIG. 3B shows an example of updating in step 340 in further detail. First in step 342, the updating includes normalizing initial corner coordinates based on a size of the source image to obtain final predicted corner coordinates in units of pixels. For example, normalized coordinates are multiplied by the original input image size to obtain corners coordinates on that image (in pixels).

In step 344, a monitor unit aspect ratio (ar) is estimated. In one example, a monitor unit aspect ratio (such as a television screen aspect ratio) may be estimated using equations representative of the relative geometry of mobile device 110 relative to monitor unit 105. For example, the equations described in the paper, Z. Zhang et al., *Whiteboard It! Convert Whiteboard Content into an Electronic Document*, published by Microsoft Research, dated Aug. 12, 2002, may be used. In this case, the detected corner coordinates on the mobile device can be considered a quadrilateral. Because of the difference in geometry and orientation between the mobile device and the monitor unit a perspective distortion occurs, and the rectangular monitor unit display whose aspect ratio is being estimated appears as a quadrilateral in the source image at the mobile device. Given a known focal length f of camera 222, a 3D transformation between a world coordinate system of the monitor unit and the camera 222 in the mobile device 110, and assuming square pixels with a pixel aspect ratio s, an estimated value ar, that is a ratio (w/h) of a width w to height h, for the monitor unit can be determined, as described in the Z. Zhang et al. paper at Section 4, pp. 8-10.

In step 346, the level of confidence in the final predicted corner coordinates is classified based on the estimated monitor unit aspect ratio (ar) and the obtained uncertainty value (U). For instance, the estimated TV aspect ratio (ar) and uncertainty value (U) may be used to classify current predictions as "good" or "bad". It may be performed using a simple linear classifier. In one case, the classifier was trained with predictions of the deep neural network for a test dataset using a Ridge Classifier. For that training, the inventors considered samples with maximum coordinate prediction error <=50 pixels as "good" and others as "bad". For both training and inference (prediction), one can use the following feature vector: [ar, u, $ar^2$, $U^2$, ar*u]. One can calculate a dot product of the feature vector and a weights vector, and sum it with a bias to get a confidence value. Further one can compare the confidence value with a threshold. If the confidence value is less than the threshold value, then the current prediction (i.e., the predicted corner coordinates) may be considered as "not good enough". The weights vector, the bias and the threshold may be obtained during classifier training as would be apparent to a person skilled in the art given this description. This classifier and its settings are illustrative and not intended to be limiting. Other settings and types of classifiers may be used depending upon a particular application. When a classification is considered good as it exceeds a threshold, detected corner coordinates (such as, 118A-118D) are updated with the most recent predicted corner coordinates.

Returning to FIG. 3A, in step 350, control proceeds to a pose estimate. In particular, a pose of the mobile device relative to the monitor unit is estimated when a level of confidence in the updated corner coordinates exceeds a threshold. This pose estimation includes estimation of mobile device 110 and monitor unit 105 relative to one another and may be provided in world space coordinates. Any pose estimation calculation may be used including but not limited to the pose estimation calculation described in the Z. Zhang et al. paper at Section 4.2, p. 10.

Figure 4:
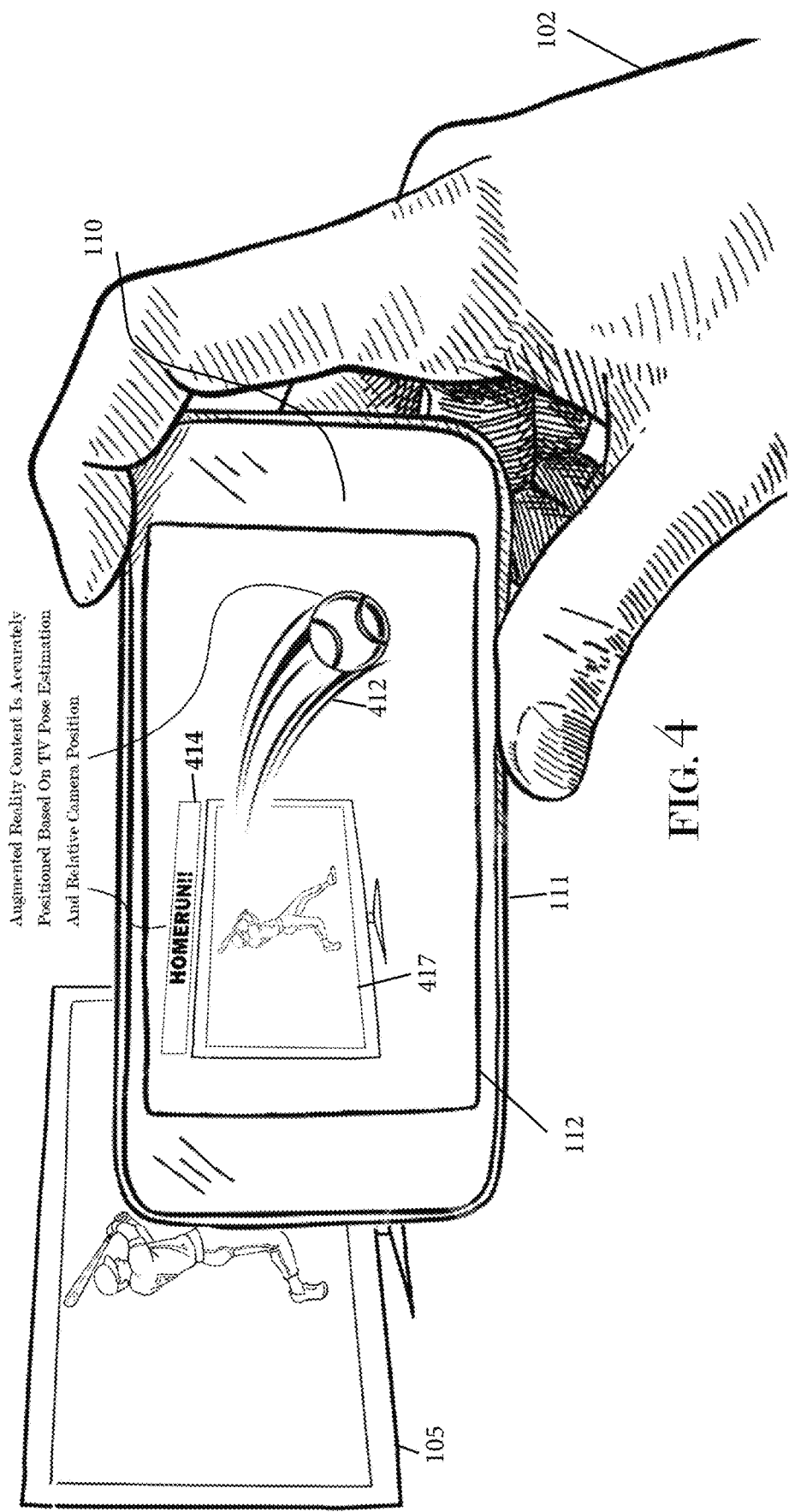
FIG. 4 is a diagram illustrating a mobile device that positions augmented reality content for display according to detected corner coordinates and pose estimation according to an embodiment of the present invention.

This pose estimation further allows augmentation reality content to be positioned more accurately. For example, FIG. 4 illustrates augmented reality content (412, 414) positioned more accurately for display according to detected corner coordinates and pose estimation according to an embodiment of the present invention. Because the pose estimation provides an estimation of the relative orientation of the mobile device 110 and monitor unit 105, a display 417 with predicted corner coordinates can be oriented within a display 112 to match the orientation of display 107. In this way, the source images shown in display 417 can be oriented the same or similar to the source content in display 107 of monitor unit 105. Moreover, given this pose estimation, augmented reality content can be positioned with display 417 more accurately and oriented relative to display 417 (and user 102) to provide an enhanced user viewing experience. For example, as shown in FIG. 4, using a pose estimate a trajectory 412 of an object (such as a ball) can be oriented more accurately to show movement from display 417 toward user 102. Likewise, using the pose estimation, the orientation of an augmented reality banner 414 can be aligned with the display 417 to enhance user experience and consistency with the viewing content in display 417.

Training and Example Run on a DNN

As mentioned above in a further feature, neural network model 235 may be trained to recognize coordinate and shape information and improve classification of predicted corner coordinates. This training may be done by processor 220 on mobile device 110. In other examples, this training may be done offline or on a separate computing device or cluster of computing devices.

This section describes further examples of used dataset details, data augmentation kinds and training strategy for example runs on a DNN and is not intended to be limiting.

In one example run, the inventors trained a deep neural network with stochastic gradient descent with mini-batches of 64 samples each using an Adam optimizer with the following parameters:

Learning rate=0.001
Beta1=0.9
Beta2=0.999
Epsilon=1e-08.

These are example default Adam optimizer parameters in a Tensorflow framework. These are illustrative only and other values may be used. For example, different values may be used with different learning rates.

In an example run, a deep neural network was trained for 200 epochs. This number of epochs was selected as a baseline because in most of the cases the inventors didn't observe noticeable training/validation loss reduction after it. But of course, in some particular rare cases further training can give some benefits. The number of training steps in epoch as described below:

Training steps=(real dataset size/real data portion)/batch size, where "real dataset size" is the size of overall image set, "real data portion" is the a portion of real data among all data used for training (real, synthetic semi-synthentic)", and "batch size" is the number of dataset samples to work with before updating the model parameters.

For example:
Real dataset size=100 images
Real data portion=0.5
This leads to overall data size used to train 1 epoch equals to
100/0.5=200 (100 real samples and 100 synthetic or semi-synthetic).
So, if we set the batch size=10,
then the number of steps in epoch would be:
200/10=20 steps Three kinds of data may be used for deep neural network training: real data, synthetic data, and semi-synthetic data.

Real Data

Real data may consist of images obtained from manually recorded and annotated video files with different TVs displaying different videos in different environments and lighting conditions. In one implementation, a training and validation dataset contains about 28000 of such samples.

Synthetic Data

To make overall training dataset more diverse the inventors recognized synthetic data may be added. Synthetic samples are generated on the fly during training using two components:

(i) Images of different TVs obtained from online marketplaces. For each of such images get grayscale TVs images (with transparent screen and background) and smoothed masks (for screen and background). Further one may produce auxiliary dataset by generating long sequences of realistic perspective transformations for that images and masks. In one example, the inventors used a dataset that contains about 3,000 of such samples.

(ii) Images obtained from different TV and online shows video files. They may be form another auxiliary dataset used for filling TV screen and background. In one example, the inventors used a dataset that contains about 430,000 of such samples.

Figure 7:
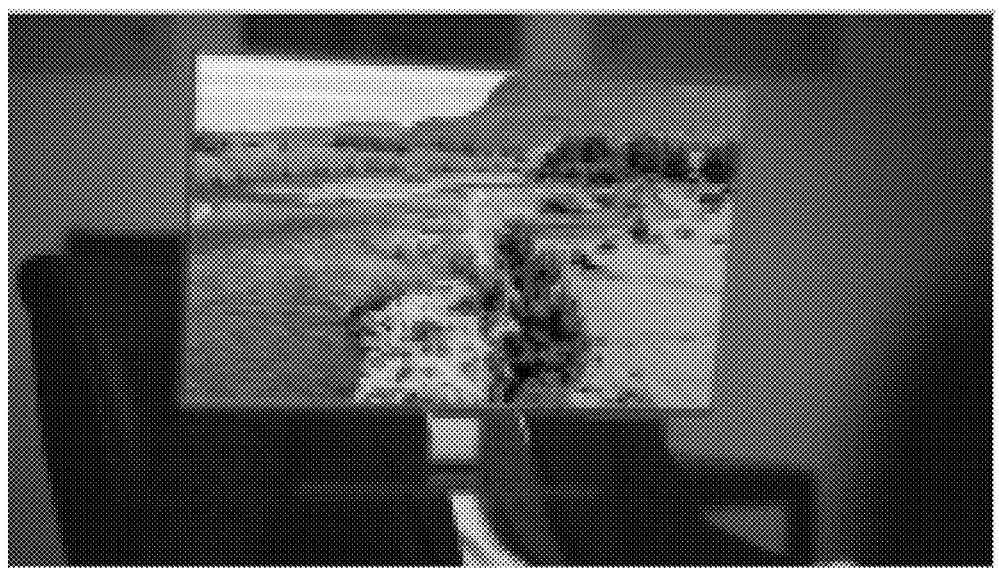
FIG. 7 shows an example image dataset generated synthetically.

During deep neural network training synthetic samples may be generated by blending randomly sampled sequences of TV images with randomly sampled sequences of display screen and background images using masks. FIG. 7 shows an example image dataset generated synthetically. Synthetic samples are generated by blending randomly sampled sequences of TV images with randomly sampled sequences of screen and background images using masks. These synthetic samples may be used in an image set to train a classifier in neural network model 235.

Semi-synthetic data

To make synthetic dataset more realistic and diverse, we may also use semi-synthetic dataset generator to be used as additional datasets. Semi-synthetic samples are generated on the fly during training using two components:

(i) Images from real dataset. For each of such images, one can get a smoothed TV screen mask.

(ii) Screen images from synthetic dataset.

Figure 8:
FIG. 8 shows an example image dataset generated semi-synthetically.

FIG. 8 shows an example image dataset generated semi-synthetically. Semi-synthetic samples are generated by blending randomly sampled sequences of real images with randomly sampled sequences of screen images using masks. These semi-synthetic samples may be used in an image set to train a classifier in neural network model 235.

During deep neural network training semi-synthetic samples may be generated by blending randomly sampled sequences of real images with randomly sampled sequences of screen images using masks.

Mixing Different Types of Samples

In example runs, the inventors tried different proportions of real, synthetic and semi-synthetic data used for training. In one preferred implementation of a baseline deep neural network training, a proportion of samples may be used: 50% real samples+25% synthetic samples+25% semi-synthetic samples.

Data Augmentation

In a further example, the inventors used the following types of data augmentation (in the same sequence) during training: Random blur, Random gamma adjustment, Random contrast adjustment, Random brightness adjustment, and Random image flip (horizontal and vertical). This set of augmentations may be used to simulate different lighting conditions and camera states (for example; sudden movement or device shake, bad camera focusing or lighting exposure). Absence of more complicated geometric augmentations, like affine or perspective transformation, is compensated by synthetic data usage (because they could be very computationally expensive to do in runtime).

Alternatives

In a further example not intended to be limiting, corner coordinate detection as described herein may also be used in systems and methods described in commonly-owned U.S. patent application Ser. No. 15/983,731, filed May 18, 2018, (published as US 2018/0352186 A1 and incorporated by reference in its entirety herein) in place of the corner coordinate detection described therein including the TV corners detection step 404 in FIG. 3.

In this document, the terms "computer program medium," "computer-usable medium" and "non-transitory medium" are used to generally refer to tangible media for storing electronic data including instructions for controlling a processor. Signals carried over a wired or wireless communication path or other transitory media can also embody the logic described herein. Computer program medium and computer usable medium can also refer to computer-readable memories which can be memory semiconductors (e.g. DRAMs, etc.). These computer program products are means for providing software to a processor, device or computer system.

Computer programs (also called computer control logic) may be stored in a memory (such as memory 230). Computer programs may also be received via communication and network interface (such as an interface 260). Such computer programs, when executed, enable a device or system to implement embodiments as discussed herein. In particular, the computer programs, when executed, enable one or more processors (such as processor 220) to implement the disclosed processes, such as the steps in the methods illustrated by flowcharts discussed above. Accordingly, such computer programs may represent controllers of the devices or system. In some embodiments implemented using software, the software may be stored in a computer program product and loaded into a computing device using a removable storage drive, interfaces, hard drive or a communication and network interface, for example.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments but should be defined only in accordance with the following claims and their equivalents.

What is claimed is:

1. A system for detecting information about a screen display shown at a monitor unit within the field of view of a camera of a vision-based computing device, comprising:
   a memory configured to store a set of source images captured by the camera representative of the screen display shown at the monitor unit;
   a processor configured to:
   load a neural network model for storage in the memory;
   preprocess the set of source images stored in the memory to obtain an input frame; and
   process the input frame with the loaded neural network model to predict corner coordinates of the screen display,
   wherein the processor is further configured to process the input frame with the loaded neural network model to obtain an uncertainty value representative of a level of confidence in the predicted corner coordinates of the screen display, and to update the predicted corner coordinates of the screen display when a level of confidence exceeds a threshold.

2. The system of claim 1, wherein to update the predicted coordinates the processor is further configured to normalize initial corner coordinates based on a size of the source image to obtain final predicted corner coordinates in units of pixels.

3. The system of claim 2, wherein the processor is further configured to:
   estimate a monitor unit aspect ratio; and
   classify the level of confidence in the final predicted corner coordinates based on the estimated monitor unit aspect ratio and the obtained uncertainty value.

4. The system of claim 1, wherein the processor is further configured to estimate a pose of the vision-based computing device relative to the monitor unit when a level of confidence in the updated corner coordinates exceeds a threshold.

5. The system of claim 1, wherein the loaded neural network model comprises an artificial neural network model.

6. The system of claim 5, wherein vision-based computing device comprises a mobile device having the processor and the processor is configured to process the input frame with the artificial neural network model in real-time to predict corner coordinates of the screen display.

7. The system of claim 6, wherein the mobile device comprises a handheld computing device housing the memory and the processor.

8. The system of claim 6, wherein the mobile device comprises a wearable computing device housing the memory and the processor.

9. A method for detecting information about a screen display shown at a monitor unit within the field of view of a camera of a vision-based computing device, comprising:
    loading a neural network model for storage in the memory of the vision-based computing device;
    storing a set of source images captured by the camera representative of the screen display shown at the monitor unit;
    preprocessing the set of source images stored in the memory to obtain an input frame; and
    processing the input frame with the loaded neural network model to predict corner coordinates of the screen display,
    wherein processing the input frame includes processing the input frame with the loaded neural network model to obtain an uncertainty value representative of a level of confidence in the predicted corner coordinates of the screen display, and wherein the method further comprises updating the predicted corner coordinates of the screen display when a level of confidence exceeds a threshold.

10. The method of claim 9, wherein the updating includes normalizing initial corner coordinates based on a size of the source image to obtain final predicted corner coordinates in units of pixels.

11. The method of claim 9, wherein the updating further includes:
    estimating a monitor unit aspect ratio; and
    classifying the level of confidence in final predicted corner coordinates based on the estimated monitor unit aspect ratio and the obtained uncertainty value.

12. The method of claim 9, further comprising estimating a pose of the vision-based computing device relative to the monitor unit when a level of confidence in the updated corner coordinates exceeds a threshold.

13. A vision-based computing device having a non-transitory computer-readable medium with instructions stored thereon, that when executed by at least one processor, cause the at least one processor to perform operations relating to detecting information about a screen display shown at a monitor unit within the field of view of a camera, the operations comprising:
    loading a neural network model for storage in memory;
    storing a set of source images captured by the camera representative of the screen display shown at the monitor unit;
    preprocessing the set of source images stored in the memory to obtain an input frame; and
    processing the input frame with the loaded neural network model to predict corner coordinates of the screen display,
    wherein the input frame processing operation includes processing the input frame with the loaded neural network model to obtain an uncertainty value representative of a level of confidence in the predicted corner coordinates of the screen display, and wherein the at least one processor is caused to further perform updating the predicted corner coordinates of the screen display when a level of confidence exceeds a threshold.

14. The device of claim 13, wherein the updating further includes:
    estimating a monitor unit aspect ratio; and
    classifying the level of confidence in final predicted corner coordinates based on the estimated monitor unit aspect ratio and the obtained uncertainty value.

* * * * *